United States Patent
Tomono et al.

(10) Patent No.: US 11,061,830 B2
(45) Date of Patent: Jul. 13, 2021

(54) DATA OUTPUT CONTROL APPARATUS, INFORMATION PROCESSING APPARATUS, AND DATA OUTPUT CONTROL METHOD

(71) Applicant: FUJITSU LIMITED, Kawasaki (JP)

(72) Inventors: Mitsuru Tomono, Higashimurayama (JP); Takahiro Notsu, Takatsu (JP); Katsuhiro Yoda, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 16/438,526

(22) Filed: Jun. 12, 2019

(65) Prior Publication Data

US 2019/0294560 A1    Sep. 26, 2019

Related U.S. Application Data

(63) Continuation of application No. PCT/JP2018/000114, filed on Jan. 5, 2018.

(30) Foreign Application Priority Data

Jan. 18, 2017 (JP) ............................ JP2017-006823

(51) Int. Cl.
*G06F 12/14* (2006.01)
*H04L 9/16* (2006.01)
(Continued)

(52) U.S. Cl.
CPC .......... *G06F 12/1408* (2013.01); *G06F 21/60* (2013.01); *H04L 9/14* (2013.01); *H04L 9/16* (2013.01)

(58) Field of Classification Search
CPC ....... G06F 12/1408; G06F 21/60; H04L 9/14; H04L 9/16
(Continued)

(56) References Cited

U.S. PATENT DOCUMENTS 5,081,675 A * 1/1992 Kittirutsunetorn ..........................
                                                  G06F 12/1408
                                                  705/51
5,621,794 A * 4/1997 Matsuda .............. H04N 7/1675
                                                  348/415.1
(Continued)

FOREIGN PATENT DOCUMENTS

JP    05-091101    4/1993
JP    07-044375    2/1995
(Continued)

OTHER PUBLICATIONS

International Search Report, mailed in connection with PCT/JP2018/000114 and dated Mar. 13, 2018 (2 pages).
(Continued)

*Primary Examiner* — Dant B Shaifer Harriman
(74) *Attorney, Agent, or Firm* — Fujitsu Patent Center (57) ABSTRACT

An apparatus for data output control includes: an encryption executing circuit configured to receive first data from a processor with a control signal indicating whether the first data is to be encrypted, and encrypt the first data when the control signal indicates that the first data is to be encrypted; a selection circuit configured to output any of the encrypted first data and second data; and an output control unit configured to set a frequency of second timing to be smaller than a frequency of first timing, and transmit a signal to the selection circuit instructing that the second data be outputted at the second timing, in a case where the second data is received from the processor.

6 Claims, 5 Drawing Sheets

(51) Int. Cl.
    *H04L 9/14*      (2006.01)
    *G06F 21/60*     (2013.01)
(58) Field of Classification Search
    USPC ........................................................ 713/193
    See application file for complete search history.

(56) References Cited

U.S. PATENT DOCUMENTS

| | | |
|---|---|---|
| 6,182,217 B1 | 1/2001 | Sedlak |
| 2005/0149635 A1* | 7/2005 | Otsuka ................... H04N 19/42 |
| | | 710/1 |

FOREIGN PATENT DOCUMENTS

| | | |
|---|---|---|
| JP | 11-088857 | 3/1999 |
| JP | 2001-513929 | 9/2001 |
| JP | 2009-258960 | 11/2009 |
| JP | 2010-026588 | 2/2010 |
| JP | 2015-005972 | 1/2015 |
| JP | 2016-107571 | 6/2016 |
| WO | 2006/134517 | 12/2006 |

OTHER PUBLICATIONS

Written Opinion of the International Searching Authority, mailed in connection with PCT/JP20181000114 and dated Mar. 13, 2018, with partial English translation (7 pages).
JPOA—Office Action of Japanese Patent Application No. 2017-006823 dated Mar. 3, 2020 with Machine translation. ** The remaining references cited in the JPOA were previously submitted in the IDS filed on Jun. 12, 2019.

* cited by examiner

DATA OUTPUT CONTROL APPARATUS, INFORMATION PROCESSING APPARATUS, AND DATA OUTPUT CONTROL METHOD

CROSS-REFERENCE TO RELATED APPLICATION

This application is a continuation application of International Application PCT/JP2018/000114 filed on Jan. 5, 2018 and designated the U.S., the entire contents of which are incorporated herein by reference. The International Application PCT/JP2018/000114 is based upon and claims the benefit of priority of the prior Japanese Patent Application No. 2017-006823, filed on Jan. 18, 2017, the entire contents of which are incorporated herein by reference.

FIELD

The embodiment discussed herein is related to, for example, a data output control apparatus that handles data including confidential information, an information processing apparatus, and a data output control method.

BACKGROUND

In an apparatus that handles data including confidential information that is personal information and the like, such as images and the like with a person, it is required to avoid the confidential information from being leaked to a third party. Therefore, there has been proposed technology for making it impossible to identify confidential information by processing part of target data, or for outputting the target data after subjecting the target data to gradation reduction or encryption (for example, refer to Japanese Laid-open Patent Publication No. 7-44375, Japanese Laid-open Patent Publication No. 2010-26588, and Japanese Laid-open Patent Publication No. 2015-5972).

SUMMARY

According to an aspect of the embodiments, an apparatus for data output control, the apparatus includes: an encryption executing circuit configured to receive first data from a processor with a control signal indicating whether the first data is to be encrypted, and encrypt the first data when the control signal indicates that the first data is to be encrypted; a selection circuit configured to output any of the encrypted first data and second data, the second data being received from the processor with the control signal indicating that the second data is not to be encrypted; and an output control unit configured to set a frequency of second timing to be smaller than a frequency of first timing, the first timing being timing at which the encrypted first data is enabled to be outputted, and the second timing being timing at which non-encrypted second data is enabled to be outputted, and transmit a signal to the selection circuit instructing that the second data be outputted at the second timing, in a case where the second data is received from the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In these related techniques, when a processor that executes a process on target data for avoiding leakage of confidential information is cracked from the outside, there is a possibility that the target data will be outputted to the outside without such a process being performed on the target data. As a result, a third party may not be avoided from illegally obtaining confidential information.

According to one aspect, an object of the present embodiment is to provide a data output control apparatus capable of avoiding leakage of confidential information.

Hereinafter, an information processing apparatus having a data output control apparatus will be described with reference to the drawings. This information processing apparatus is implemented, for example, in a sensing system that handles data including confidential information, such as a connected home or the like. This information processing apparatus includes a processor that executes specified processing on data including confidential information, and an encrypting unit provided between a bus and the processor. The encrypting unit is an example of a data output control apparatus, and encrypts data that includes confidential information and that is received from the processor, and writes the encrypted data to a memory connected via the bus. The encrypting unit also writes data including processing results received from the processor (hereinafter, for convenience, will be referred to as context) to the memory without performing encryption. The encrypting unit then makes the frequency of the timing at which the non-encrypted context is enabled to be written to the memory less than the frequency of the timing at which the encrypted data is enabled to be written to the memory. As a result, even presuming a case where the processor is cracked and data including confidential information is outputted without being encrypted, the time required for the data to be written to the memory becomes very long. As a result, the information processing apparatus substantially avoids the data including the confidential information from being accessible from the outside, thereby avoiding leakage of the confidential information.

Figure 1:
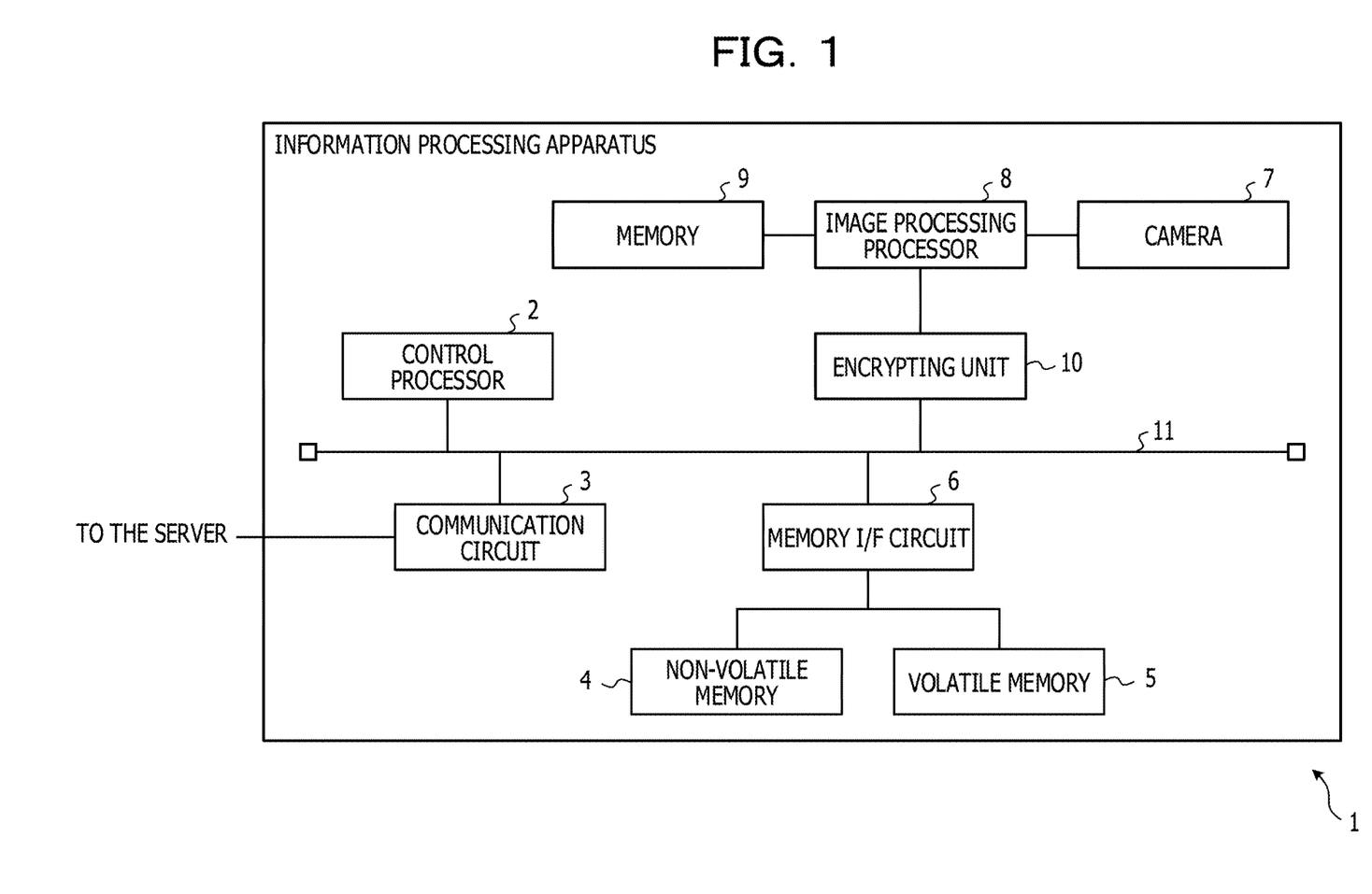
FIG. 1 is a schematic configuration diagram of an information processing apparatus according to an embodiment.

FIG. 1 is a schematic configuration diagram of an information processing apparatus according to an embodiment.

An information processing apparatus 1 includes a control processor 2, a communication circuit 3, a non-volatile memory 4, a volatile memory 5, a memory interface circuit 6, a camera 7, an image processing processor 8, a dedicated memory 9, an encrypting unit 10, and a bus 11. The information processing apparatus 1 is implemented in a system that handles confidential information in the form of, for example, a system-on-a-chip (SOC) or the like. Each of these units included in the information processing apparatus 1 may be formed as a single chip or may be separately provided on a plurality of chips. Furthermore, the information processing apparatus 1 may have a sensor (not illustrated) other than a camera, such as a microphone, a temperature sensor, an infrared sensor or the like.

The control processor 2, the communication circuit 3, the memory interface circuit 6 and the encrypting unit 10 are each connected to a bus 11 and communicate various data or signals with each other via the bus 11. The non-volatile memory 4 and the volatile memory 5 are both connected to the bus 11 via the memory interface circuit 6. Moreover, the image processing processor 8 is connected to the bus 11 via the encrypting unit 10. Furthermore, the camera 7 and the dedicated memory 9 are connected to the image processing processor 8 without passing through the bus 11, so may exchange an image or processing program with the image processing processor 8 without going through the bus 11.

The control processor 2 has one or a plurality of processors and controls the entire information processing apparatus 1. For example, the control processor 2 selects a process for the image processing processor 8 to execute according to a control program operating on the control processor 2 or according to an external command received via the communication circuit 3. Then, the control processor 2 transmits a control command including information representing the selected process to the image processing processor 8 via the bus 11 and the encrypting unit 10. Moreover, the control processor 2 reads context representing processing results by the image processing processor 8 from the volatile memory 5, and executes processing according to that context. Alternatively, the control processor 2 generates a transmission signal including the context, and passes the transmission signal to the communication circuit 3 via the bus 11.

The communication circuit 3 is an interface circuit for connecting the information processing apparatus 1 to a communication line such as the Internet or the like (not illustrated), and transmits or receives information according to a standard of that communication line. The standard of the communication line may be, for example, Ethernet (registered trademark). Then, the communication circuit 3 outputs the transmission signal received from the control processor 2 to another apparatus such as a server or the like of the sensing system via the communication line. Alternatively, the communication circuit 3 passes the command or information received via the communication line to the control processor 2 via the bus 11.

The non-volatile memory 4 is, for example, a non-volatile semiconductor memory such as a mask ROM or a flash memory (registered trademark), and stores one or more processing programs to be executed by the image processing processor 8. When the non-volatile memory 4 receives a read request signal from the image processing processor 8 for reading a processing program stored at a specified address, the non-volatile memory 4 outputs the processing program to the memory interface circuit 6. Then, the processing program is read into the image processing processor 8 via the memory interface circuit 6, the bus 11, and the encrypting unit 10, and is written to the dedicated memory 9 via the image processing processor 8.

The volatile memory 5 is a readable/writable volatile semiconductor memory, and may, for example, be a double-data-rate synchronous dynamic random access memory (DDR SDRAM). The volatile memory 5 temporarily stores various data such as an encrypted image or context acquired while the information processing apparatus 1 is operating. In this embodiment, a memory area (hereinafter referred to as an encrypted area) in which data including confidential information is stored in an encrypted state, and a memory area (hereinafter referred to as a non-encrypted area) in which non-encrypted data is stored are separately provided in the volatile memory 5. The data including confidential information is, for example, an image generated by the camera 7, and non-encrypted data is, for example, context. Then, for example, data that is outputted from the image processing processor 8 and encrypted by the encrypting unit 10 is written to the encrypted area of the volatile memory 5 via the bus 11 and the memory interface circuit 6. In addition, non-encrypted data that is outputted from the image processing processor 8 is written to the non-encrypted area of the volatile memory 5 via the bus 11 and the memory interface circuit 6.

Moreover, data that is stored in the non-encrypted area may be read out by the control processor 2 via the bus 11 and the memory interface circuit 6.

The memory interface circuit 6 is an interface circuit for connecting the non-volatile memory 4 and the volatile memory 5 to the bus 11. The memory interface circuit 6, in accordance with a protocol to which the bus 11 conforms, processes a read request from the image processing processor 8 that is for the non-volatile memory 4. Furthermore, the memory interface circuit 6 processes a read request, a write request and the like from the control processor 2 or the image processing processor 8 that is for the volatile memory 5. Then, the memory interface circuit 6 passes the data and address received from the bus 11 to the volatile memory 5, or outputs the processing program read from the non-volatile memory 4, the data read from the volatile memory 5 or the like to the bus 11.

The camera 7, at a specified period, or in accordance with an instruction from the image processing processor 8, captures an imaging range in which an object that is a target of imaging is presumed to be present, and generates an image in which the imaging range is captured. The object that is the target of imaging is, for example, a person. Each time the camera 7 generates an image, the camera 7 directly outputs that image to the image processing processor 8 without going through the bus 11.

The image processing processor 8 has one or a plurality of processors, and according to an instruction from the control processor 2, reads a processing program from the non-volatile memory 4 and stores that processing program in the dedicated memory 9. In addition, the image processing processor 8 stores the image received from the camera 7 or the encrypting unit 10 in the dedicated memory 9. Then, in accordance with the processing program stored in the dedicated memory 9, the image processing processor 8 executes processing on the image read from the dedicated memory 9. Every time processing is performed on the image, the image processing processor 8 generates context including the obtained processing result, and outputs the context to the encrypting unit 10 without specifying to encrypt that context. The image processing processor 8 may also read out the image stored in the dedicated memory 9 and, together with specifying encryption, output the image to the encrypting unit 10. For example, although the image processing processor 8 is not able to store an image that will be the target of processing in the dedicated memory 9 because the image exceeds the memory capacity of the dedicated memory 9, the image processing processor 8 may specify encrypting of the image and output that image to the encrypting unit 10.

The image processing processor 8, as a process to be performed on an image, executes a process for detecting a target object from an image, or a process for determining a state of a target object. Therefore, the image processing processor 8, for example, may detect a target object from an image by using a discriminator such as a deep neural network, AdaBoost or support vector machine for which learning has been performed for target object detection, or by pattern matching. In addition, the image processing processor 8, for example, may determine the state of the target object by referring to a table representing the relationship between the position of the detected target object or the change in the position of the target object on a plurality of successive images and the state of the target object. The image processing processor 8 then generates, as context indicating the processing result, for example, the determination result as to whether or not a target object has been detected, the number of detected target objects, or information indicating the state of the detected target object.

The dedicated memory 9 is a dedicated memory used by the image processing processor 8 and has, for example, a readable/writable volatile memory. The dedicated memory 9 receives and stores a processing program or an image from the image processing processor 8 without going through the bus 11. Moreover, the dedicated memory 9 passes the stored processing program or image to the image processing processor 8 without going through the bus 11.

The encrypting unit 10 is an example of a data output control apparatus, and encrypts or does not encrypt the data received from the image processing processor 8, and writes the data to the volatile memory 5 via the bus 11 and the memory interface circuit 6. Moreover, the encrypting unit 10 passes the processing program received from the non-volatile memory 4 via the bus 11 and the memory interface circuit 6, or the control command received from the control processor 2 to the image processing processor 8. Furthermore, the encrypting unit 10 decrypts the encrypted image received from the volatile memory 5 via the bus 11 and the memory interface circuit 6, and passes the decrypted image to the image processing processor 8.

Details of the encrypting unit 10 will be described later.

The bus 11 is a bus that operates according to a predetermined protocol (for example, Advanced eXtensible Interface (AXI)), and relays control signals or data communicated between units that are connected to the bus 11.

Details of the encrypting unit 10 will be described below.

Figure 2:
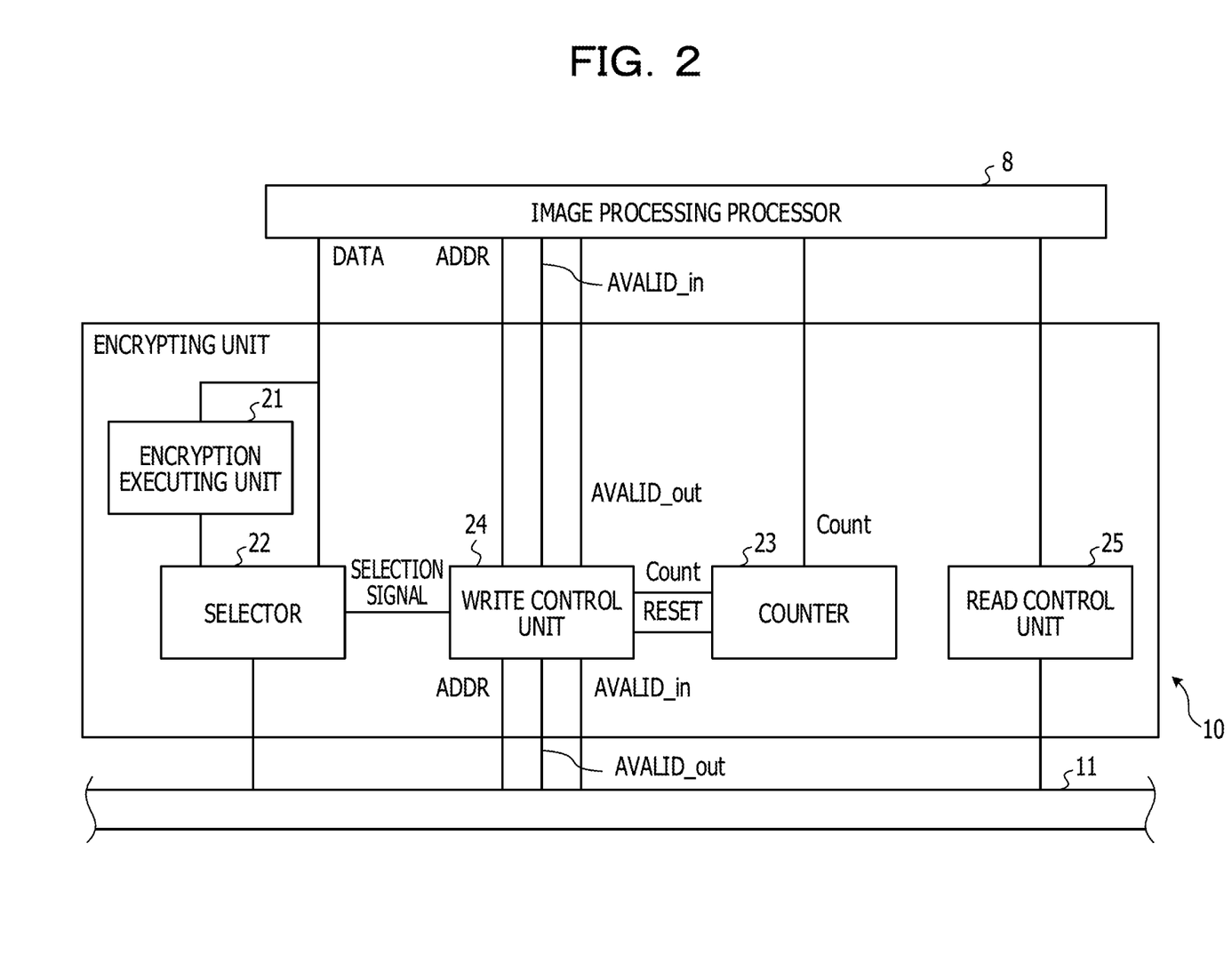
FIG. 2 is a schematic configuration diagram of an encrypting unit.

FIG. 2 is a schematic configuration diagram of the encrypting unit 10. The encrypting unit 10 has an encryption executing unit 21, a selector 22, a counter 23, a write control unit 24, and a read control unit 25. These units that are included in the encrypting unit 10 are implemented, for example, as one or a plurality of integrated circuits.

Data (an image or context in this embodiment) that is written from the image processing processor 8 to the volatile memory 5 is inputted to the encryption executing unit 21 and the selector 22 after every specified bit length. The specified bit length may be, for example, a bit length (for example, 32 bits, 64 bits or 128 bits) that the bus 11 may transmit at one time. The address of the volatile memory 5 to which the data outputted from the image processing processor 8 is written, and the control signal for the encrypting unit 10 are inputted to the write control unit 24.

The encryption executing unit 21 has, for example, a non-volatile memory for storing an encryption key, and an arithmetic circuit for executing an encryption process. Every time data that is written to the volatile memory 5 and that has a specified bit length is received from the image processing processor 8, the encryption executing unit 21 encrypts the data by using an encryption key. The encryption key stored in the encryption executing unit 21 is not outputted to the outside of the encrypting unit 10. Moreover, the encryption process by the encryption executing unit 21 may conform, for example, to a common key encryption method such as data encryption standard (DES) or advanced encryption standard (AES) or to a public key encryption method such as RSA encryption. The encryption executing unit 21 outputs the encrypted data to the selector 22.

The selector 22 is an example of a selection unit, and based on a selection signal received from the write control unit 24, one of the encrypted data received from the encryption executing unit 21 and the non-encrypted data received from the image processing processor 8 is outputted to the bus 11. For example, in a case where a selection signal received from the write control unit 24 indicates that the non-encrypted data is to be outputted, the selector 22 outputs the non-encrypted data that is received from the image processing processor 8 (for example, context) to the bus 11. On the other hand, in a case where the selection signal received from the write control unit 24 indicates that the data received from the encryption executing unit 21 is to be outputted, the selector 22 outputs the encrypted data received from the encryption executing unit 21 (for example, part of an image) to the bus 11.

The selector 22 may have a buffer (not illustrated). The selector 22 may temporarily store the encrypted data received from the encryption executing unit 21 or the non-encrypted data received from the image processing processor 8 in the buffer until a selection signal is received from the write control unit 24. Then, after receiving the selection signal, the selector 22 may output the data that is stored in the buffer and that is instructed to be outputted.

The counter 23 decrements a count value by one from a preset upper limit count value at each clock cycle of a clock for operating the encrypting unit 10. The counter 23 outputs the count value to the write control unit 24 and the image processing processor 8 each time the count value is updated. When the counter 23 receives a reset signal from the write control unit 24, the counter 23 sets the count value to the upper limit count value.

In this embodiment, when the count value becomes 0, the write control unit 24 allows writing from the image processing processor 8 to the non-encrypted area of the volatile memory 5. On the other hand, when the count value is a value other than 0, the write control unit 24 does not allow writing from the image processing processor 8 to the non-encrypted area of the volatile memory 5.

The upper limit count value and the clock cycle are set in accordance with the frequency of the timing at which writing from the image processing processor 8 to the non-encrypted area of the volatile memory 5 is allowed. Furthermore, it is preferable that the frequency of the timing which writing to the non-encrypted area is allowed be set so as to be sufficient as, for example, the frequency at which the context is outputted, and to be insufficient as the frequency for writing the image to the non-encrypted area of the volatile memory 5.

For example, it is presumed that the frequency of the timing at which writing from the image processing processor 8 to the non-encrypted area of the volatile memory 5 is allowed is set to 1 byte/sec. It is also presumed that the bit length of data to be written one time (in other words, a word) to the non-encrypted area is 64 bits. In this case, for example, the clock frequency of the encrypting unit 10 may be set to 100 MHz (in other word, one clock cycle is 0.01 μsec), and the upper limit count value may be set to 800 M (or in other words, 800 million counts). In a case where burst transfer is used for writing from the image processing processor 8 to the volatile memory 5, and when the clock frequency is 100 MHz, the upper limit count value may be set to 800 M×b. The parameter b is the number of words that may be written in one burst transfer (burst number). For example, when the burst number b is 16, the upper limit count value is 800 M×16=12,800 M. As described above, it is preferable that the upper limit count value be set so as to be proportional to the data size at the time of writing one time so that the time required to write an image to the non-encrypted area becomes sufficiently long.

In a case where the frequency of the timing at which writing from the image processing processor 8 to the non-encrypted area of the volatile memory 5 is allowed is 1 byte/sec, the time required to write an RGB image having 640×480 pixels is, for example, 256 hours (640×480×3=921,600 bytes/(60×60×1=3,600 bytes/h)=256 h). In this way, by limiting the frequency of the timing at which writing to the non-encrypted area of the volatile memory 5 is allowed, data including confidential information having a relatively large size such as an image is avoided from being written to the non-encrypted area in a realistic required time.

The write control unit 24 is an example of an output control unit, and controls the timing of writing data from the image processing processor 8 to the volatile memory 5. In this embodiment, when the write control unit 24 receives a write request signal and the address of a writing destination from the image processing processor 8, the write control unit 24 refers to the address and determines whether to write to the non-encrypted area or write to the encrypted area of the volatile memory 5. Therefore, for example, a table indicating the range of addresses corresponding to the non-encrypted area and the range of addresses corresponding to the encrypted area of the volatile memory 5 is stored in advance in a non-volatile memory of the write control unit 24. Then, for example, the write control unit 24 may reference that table and determine whether the address received from the image processing processor 8 is included in the non-encrypted area or in the encrypted area.

In a case where the address of the writing destination is included in the encrypted area, the write control unit 24 outputs a selection signal to the selector 22 indicating that the encrypted data received from the encryption executing unit 21 is to be outputted regardless of the count value of the counter 23. For example, the timing at which the encrypted data is received becomes the timing at which that data is enabled to be outputted. In addition, the write control unit 24 outputs the address of the writing destination to the bus 11.

On the other hand, in a case where the address of the writing destination is included in the non-encrypted area, the write control unit 24 waits until the count value of the counter 23 becomes zero. Then, when the count value of the counter 23 becomes 0, the write control unit 24 outputs a selection signal to the selector 22 indicating that the data received directly from the image processing processor 8 is to be outputted. For example, the timing at which the count value becomes 0 becomes the timing at which non-encrypted data is enabled to be outputted. In addition, the write control unit 24 outputs a control signal for executing writing and the address of the writing destination to the bus 11. Then, when the write control unit 24 receives a write completion signal from the bus 11 indicating that the writing of data has been completed, the write control unit 24 resets the counter 23 and outputs the write completion signal to the image processing processor 8. As a result, the write control unit 24 may make the frequency of the timing at which the writing to the non-encrypted area is allowed less than the frequency of the timing at which the writing to the encrypted area is allowed.

In a case of writing data in the non-encrypted area of the volatile memory 5, the image processing processor 8 refers to the count value received from the counter 23, and may output data (in other words, context) to the encrypting unit 10 when the count value becomes zero. On the other hand, in a case of writing data (in other words, an image) in the encrypted area of the volatile memory 5, the image processing processor 8 may output a write request signal and the address of the writing destination together with the data to the encrypting unit 10. As a result, when writing data to the non-encrypted area, the image processing processor 8 may shorten the time for waiting for another process until the writing is completed.

Figure 3:
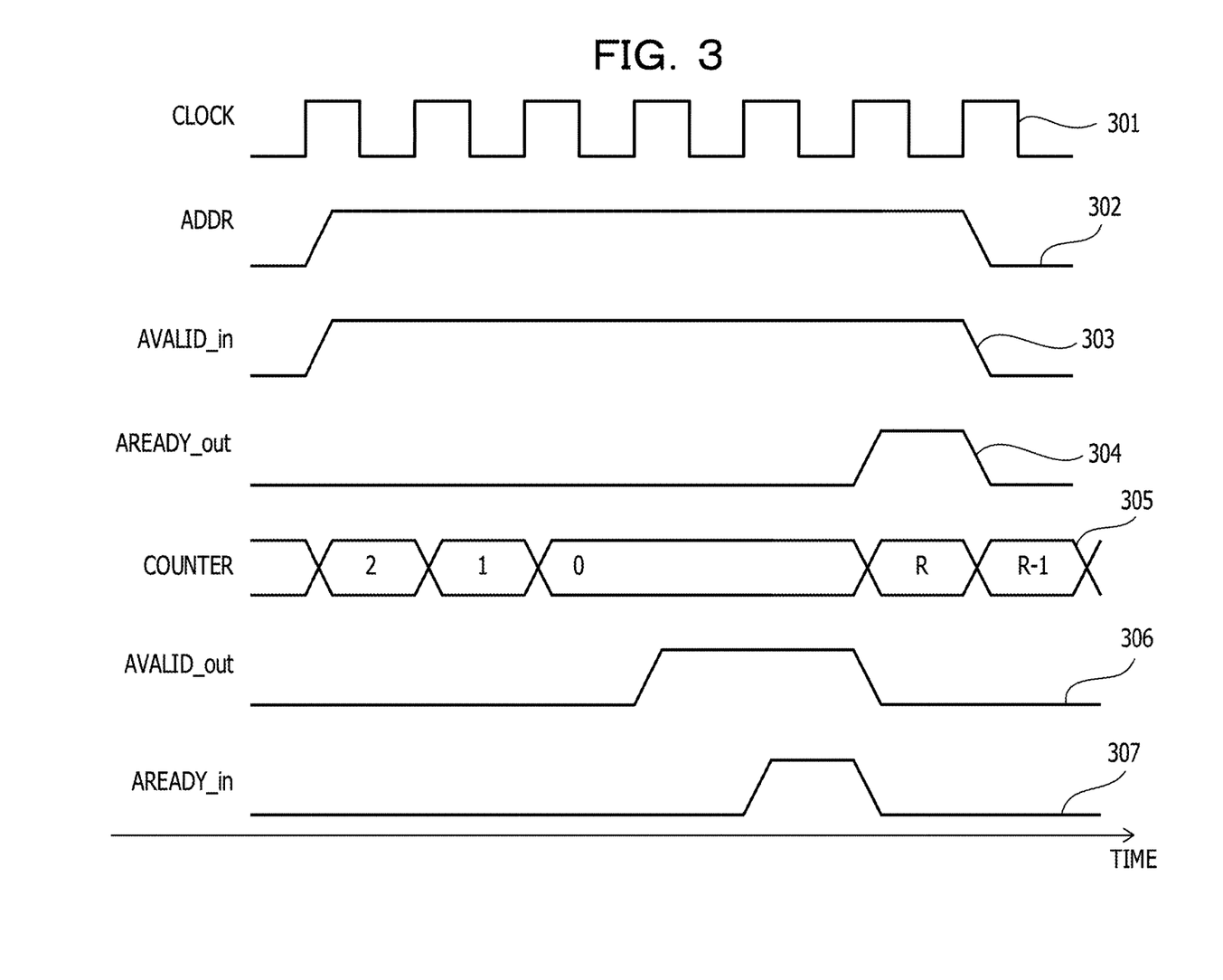
FIG. 3 is a sequence diagram illustrating the timing of respective signals at the time of writing to a non-encrypted area.

FIG. 3 is a sequence diagram illustrating the timing of respective signals at the time of writing to the non-encrypted area. In FIG. 3, the horizontal axis represents time. The very top waveform 301 represents the waveform of the clock signal of the encrypting unit 10. The second waveform 302 from the top represents the output timing of outputting the address ADDR of the writing destination from the image processing processor 8. Moreover, the third waveform 303 from the top represents the output timing of outputting the write request signal AVALID_in from the image processing processor 8. The fourth waveform 304 from the top represents the output timing of outputting the write completion signal AREADY_out from the write control unit 24 to the image processing processor 8. The fifth waveform 305 from the top represents the counter value of the counter 23. The sixth waveform 306 from the top represents the output timing of outputting the write execution signal AVALID_out from the write control unit 24 to the bus 11. The very bottom waveform 307 represents the output timing of outputting the write completion signal AREADY_in from the bus 11 to the write control unit 24. In the waveforms 302, 303, 304, 306, and 307, the timing at which the waveform rises represents the timing at which execution of output or writing of a signal corresponding to the waveform is started. Moreover, a period in which a waveform rises indicates a period in which a signal corresponding to the waveform is outputted, or a period in which writing is executed.

As illustrated in FIG. 3, at the timing when the output of the address and write request signal AVALID_in from the image processing processor 8 is started, the count value of the counter 23 is not 0, so the write execution signal AVALID_out is not outputted from the write control unit 24 to the bus 11. Then, at the next timing when the count value of the counter 23 becomes 0, the write execution signal AVALID_out is outputted. Then, after receiving the write completion signal AREADY_in, the write control unit 24 resets the counter 23 at the next timing to set the count value to the upper limit count value R, and outputs the write completion signal AREADY_out to the image processing processor 8. At the next timing after receiving the write completion signal AREADY_out, the image processing processor 8 stops the output of the address and the output of the write request signal AVALID_in.

Figure 4:
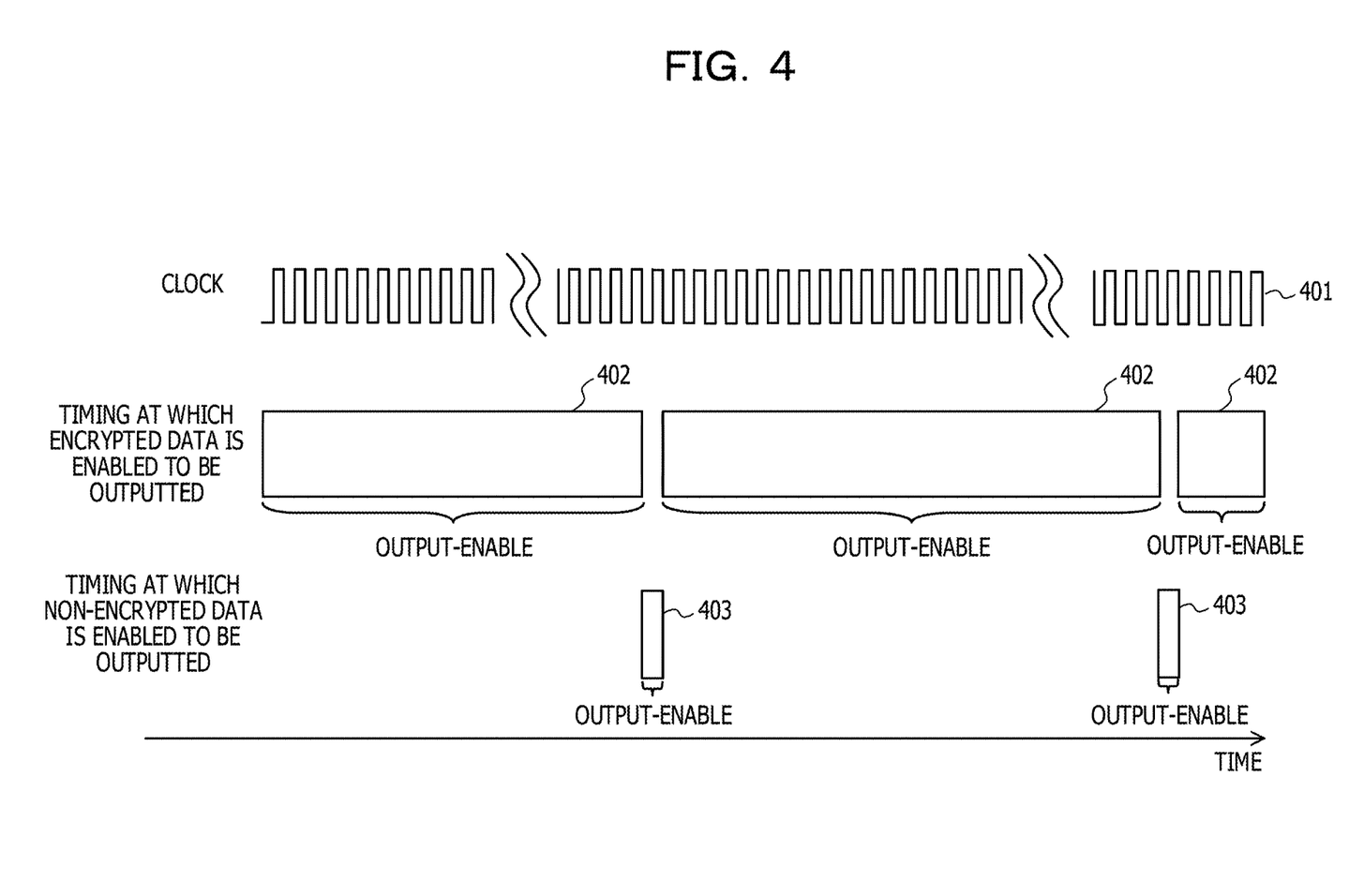
FIG. 4 is a diagram illustrating an example of timing at which encrypted data and non-encrypted data are enabled to be outputted.

FIG. 4 is a diagram illustrating an example of timing at which the encrypted data and non-encrypted data are enabled to be outputted. In FIG. 4, the horizontal axis represents time. The very top waveform 401 represents the waveform of the clock signal of the encrypting unit 10. The second block 402 from the top represents the timing at which encrypted data is enabled to be outputted, or in other words, the timing at which the encrypted data is enabled to be written to the volatile memory 5. The very bottom block 403 represents the timing at which non-encrypted data is enabled to be outputted, or in other words, the timing at which the non-encrypted data is enabled to be written to the volatile memory 5. As illustrated in FIG. 4, it is understood that the frequency of the timing at which the non-encrypted data is enabled to be outputted is less than the frequency of the timing at which the encrypted data is enabled to be outputted.

The read control unit 25 controls reading of a control command and data to the image processing processor 8. For example, the read control unit 25 passes the control command from the control processor 2 received via the bus 11 to the image processing processor 8. In addition, after receiving a read request signal and the address of the non-volatile memory 4 or the volatile memory 5 from the image processing processor 8, the read control unit 25 outputs the read request signal and the address to the memory interface circuit 6 via the bus 11. In a case of reading a processing program, the read control unit 25 receives the processing program stored at a specified address from the non-volatile memory 4 via the memory interface circuit 6 and the bus 11, and passes that processing program to the image processing processor 8.

Moreover, in a case of reading data stored in the volatile memory 5, the read control unit 25 receives the data stored at a specified address from the volatile memory 5 via the memory interface circuit 6 and the bus 11. Then, the read control unit 25 passes the data to the image processing processor 8. In a case where the specified address is included in the encrypted area, or in other words, in a case where the data stored in the specified address is encrypted, the read control unit 25 decrypts the data. The read control unit 25 then passes the decrypted data to the image processing processor 8. At this time, the read control unit 25 may decrypt the encrypted data by using the encryption key of the encryption executing unit 21 or the key serving as a pair. The key used for decryption may be stored in advance, for example, in a non-volatile memory included in the read control unit 25, and that key is not outputted to the outside of the encrypting unit 10.

According to a variation, the processing program may also be stored in the non-volatile memory 4 in a state of being encrypted by the encryption process executed by the encryption executing unit 21. In this case, the read control unit 25 may also decrypt the encrypted processing program received from the non-volatile memory 4 and pass the decrypted processing program to the image processing processor 8.

Figure 5:
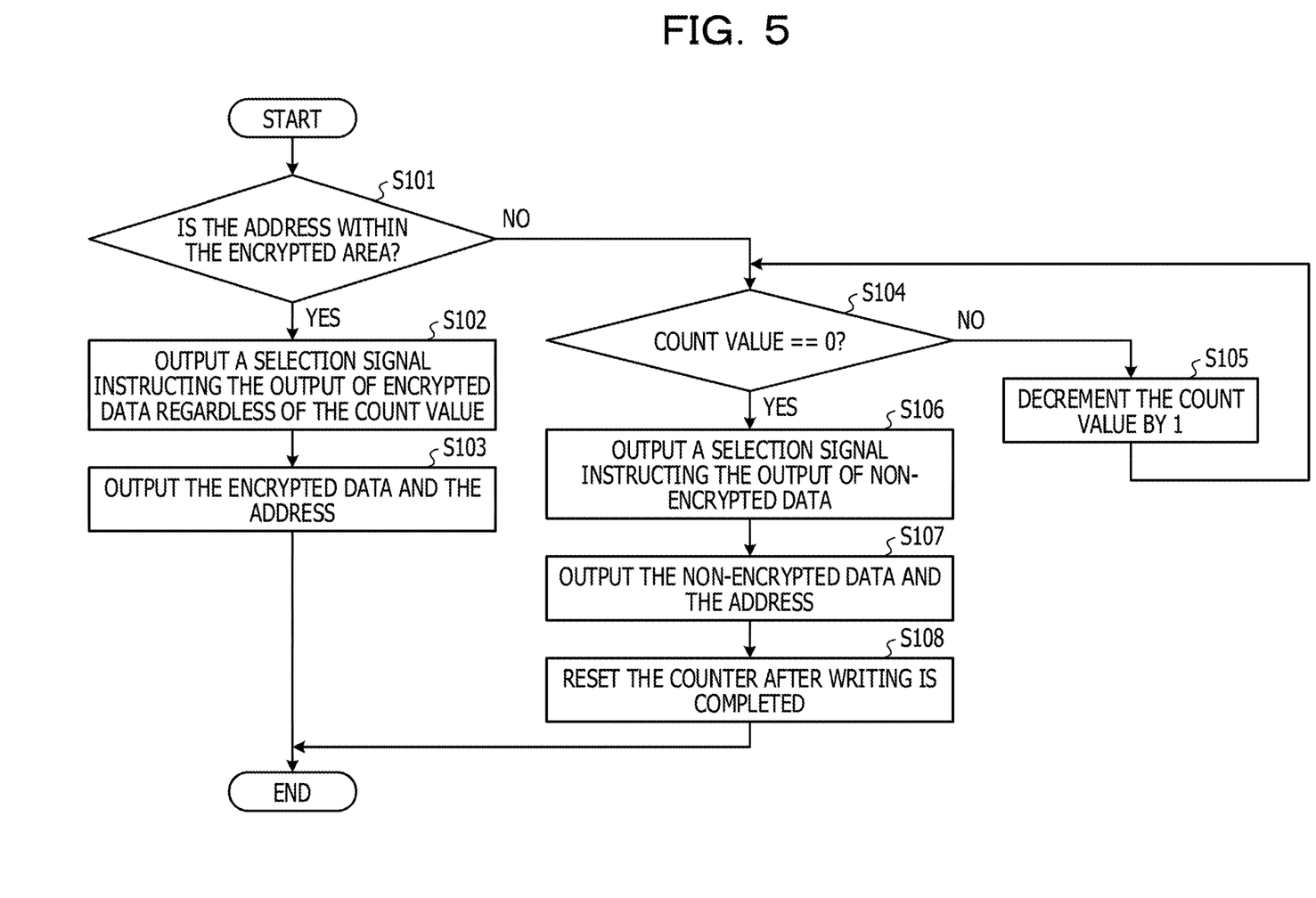
FIG. 5 is an operation flowchart of a data output control process for outputting data to a volatile memory by the encrypting unit.

FIG. 5 is an operation flowchart of a data output control process for outputting data to the volatile memory 5 by the encrypting unit 10. Every time the encrypting unit 10 writes data to the volatile memory 5, the data output control process may be executed according to the following operation flowchart.

The write control unit 24 determines whether or not the address of the writing destination of the volatile memory 5 received from the image processing processor 8 is included in the encrypted area (step S101). In a case where the address of the writing destination is included in the encrypted area (step S101: YES), the write control unit 24, regardless of the counter value, outputs a selection signal to the selector 22 indicating that the encrypted data is to be outputted (step S102). Then, the selector 22 outputs the data encrypted by the encryption executing unit 21 to the bus 11, and the write control unit 24 outputs the address of the writing destination to the bus 11 (step S103).

On the other hand, in a case where the address of the writing destination is included in the non-encrypted area (step S101: NO), the write control unit 24 determines whether or not the count value of the counter 23 is 0 (step S104). When the count value is not 0 (step S104: NO), the write control unit 24 waits until the next clock timing. The counter 23 also decrements the count value by 1 (step S105). The write control unit 24 then repeats the process of step S104 and subsequent steps.

On the other hand, when the count value is 0 (step S104: YES), the write control unit 24 outputs a selection signal to the selector 22 indicating that the data received directly from the image processing processor 8 is to be outputted (step S106). Then, the selector 22 outputs the non-encrypted data received from the image processing processor 8 to the bus 11, and the write control unit 24 outputs the address of the writing destination to the bus 11 (step S107).

After receiving a write completion signal from the bus 11, the write control unit 24 resets the counter 23 and notifies the image processing processor 8 that the writing is completed (step S108).

After step S103 or S108, the encrypting unit 10 ends the data output control process.

As described above, this information processing apparatus limits writing to the non-encrypted area so that the frequency of the timing at which writing to the non-encrypted area of an externally accessible volatile memory is enabled to be performed is less than the frequency of the timing at which writing to the encrypted area is enabled to be performed. Therefore, even when cracking is presumed to be performed, this information processing apparatus may significantly increase the time required for writing data including confidential information to the non-encrypted area without the data being encrypted. As a result, the information processing apparatus may avoid leakage of confidential information.

According to a variation, the counter 23 may increment the count value by one every clock cycle. Then, when the count value reaches the upper limit count value, the write control unit 24 may allow writing from the image processing processor 8 to the non-encrypted area of the volatile memory 5 and transmit a selection signal to the selector 22 instructing that non-encrypted data is to be outputted. Then, after writing to the non-encrypted area is completed, the write control unit 24 may reset the counter 23 and set the count value to 0.

According to another variation, the upper limit value of the count of the counter 23 may be changed by the write control unit 24 within a range from a specified minimum value to a specified maximum value. As a result, for example, in a case where the control processor 2 refers to the context, and determines that it is better to shorten the interval at which processing by the image processing processor 8 is performed, the control processor 2 may instruct the write control unit 24 to set the upper limit count value to be smaller. As a result, the encrypting unit 10 may increase the frequency of the timing at which writing to the non-encrypted area is enabled to be performed.

However, preferably the counter 23 is implemented so that counting at a count value that is equal to or less than the minimum settable value of the upper limit count value of the settable count is executed as processing by hardware. For example, of bit strings representing count values, the lower bit strings corresponding to the minimum settable value are preferably counted by hardware. As a result, the frequency of the timing at which writing from the image processing processor 8 to the non-encrypted area of the volatile memory 5 is enabled to be performed is avoided from becoming a certain frequency or larger.

According to another variation, the image processing processor 8 may notify the encrypting unit 10 of the data to be written to the volatile memory 5 and address where that data is to be written, together with a control signal for instructing whether or not to encrypt that data. In this case, the write control unit 24 of the encrypting unit 10 may reference that control signal and determine the timing for outputting the data. For example, in a case where the control signal indicates that the data is not to be encrypted, the write control unit 24 may allow the output of the data in a case where the counter value of the counter 23 becomes 0. On the other hand, in a case where the control signal indicates that the data is to be encrypted, the write control unit 24 may output the data encrypted by the encryption executing unit 21 regardless of the counter value of the counter 23.

According to this variation, it is not required for the information processing apparatus 1 to distinguish between the encrypted area and the non-encrypted area in the volatile memory 5, so the utilization efficiency of the volatile memory 5 may be improved.

According to yet another variation, the encrypting unit 10 may have a timer instead of the counter 23. In this case, the write control unit 24 may allow the output of non-encrypted data when the time counted by the timer reaches a specified time. The write control unit 24 may then reset the timer when notified by the bus 11 that the writing of the non-encrypted data to the volatile memory 5 is completed. In this variation as well, the write control unit 24 may allow the output of encrypted data each time the data is received regardless of the time counted by the timer.

Furthermore, according to still another variation, the selector 22 of the encrypting unit 10 may be provided closer to the image processing processor 8 side than the encryption executing unit 21. In this case, when the selector 22 receives a selection signal from the write control unit 24 instructing output of the encrypted data, the selector 22 outputs the data received from the image processing processor 8 to the encryption executing unit 21. The encryption executing unit 21 may then output the encrypted data to the bus 11. On the other hand, when the selector 22 receives a selection signal from the write control unit 24 instructing output of non-encrypted data, the selector 22 directly outputs the data received from the image processing processor 8 to the bus 11.

According to this variation, since the encrypting process is not executed on the data for which there is no encrypting instruction, the amount of calculation by the encrypting unit 10 is reduced, and as a result, the overall power consumption of the information processing apparatus 1 is reduced.

Moreover, according to still yet another variation, the data including confidential information may not be an image. For example, data including confidential information may be distance data generated by a three-dimensional sensor such as a depth camera, an audio signal generated by a microphone, or a temperature distribution generated by an infrared sensor. In this case, a sensor that generates data including confidential information may be directly connected to the processor connected to the bus via the encrypting unit according to the above-described embodiment or variations. For example, in a case where the data including confidential information is an audio signal, the information processing apparatus may have a microphone and a processor for audio processing instead of the camera 7 and the image processing processor 8. The microphone may generate an audio signal including audio of a sound collection target as confidential information, and output the audio signal to the processor for audio processing without going through the bus. Then, as in the case of the image processing processor according to the above-described embodiment or the variations, when the processor for audio processing writes the audio signal to the volatile memory, the processor for audio processing may specify an address included in the encrypted area of the volatile memory, and the encrypting unit may encrypt the audio signal. The processor for audio processing may also specify an address included in the non-encrypted area of the volatile memory when writing the context including the processing result for the audio signal in the volatile memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for data output control, the apparatus comprising:
   an encryption executing circuit configured to
      receive, from a processing circuit, data and a control signal, the control signal being a signal used to determine whether the data is to be encrypted, and
      in response to the control signal indicating that the data is to be encrypted, encrypt the corresponding data;
   a selection circuit configured to selectively output either first data or second data, the first data being encrypted data obtained by encrypting the received data in the encryption execution circuit in accordance with the control signal indicating that the received data is to be encrypted, the second data being non-encrypted data by bypassing the encrypting of the received data in the encryption execution circuit in accordance with the control signal indicating that the received data is not to be encrypted; and
   an output control circuit configured to
      control the selection circuit such that a frequency of second timing is smaller than a frequency of first timing, the first timing is timing at which outputting of the encrypted first data is permitted, the second timing is timing at which outputting of the non-encrypted second data is permitted,
   the output control circuit is configured to operate such that a larger a data size of the non-encrypted second data to be outputted at once, a smaller the frequency of second timing.

2. The apparatus according to claim 1, further comprising:
   a counter circuit configured to update a count value at a specified cycle,
   wherein the output control circuit is configured to
      in response to the receiving of the control signal indicating that the data is not to be encrypted, set timing at which the count value becomes a specified value as the second timing, and
      in response to the receiving of the control signal indicating that the data is to be encrypted, set the first timing regardless of the timing at which the count value becomes the specified value.

3. The apparatus according to claim 2, wherein an upper limit value of the count value by the counter circuit is set to be within a range from a specified minimum value through a specified maximum value.

4. The apparatus according to claim 1,
   wherein the control signal is a signal including address information that indicates an address in a memory, the memory being configured to store the first data and the second data both of which are outputted from the apparatus, wherein the output control circuit is configured to
- determine the control signal indicates that the received data is to be encrypted when the address information indicates an address in a first memory area, and
- determine the control signal indicates that the received data is not to be encrypted, when the address information indicates an address in a second memory area other than the first memory area.

5. An information processing apparatus comprising:

a processor configured to output first data or second data;

a memory configured to store at least any of the first data and the second data; and a data output control apparatus configured to control timing at which the first data or the second data received from the processor is outputted to the memory, the data output control apparatus includes:
- an encryption executing circuit configured to
  - receive, from a processor, data and a control signal, the control signal being a signal used to determine whether the first data is to be encrypted, and
  - in response to the control signal indicating that the data is to be encrypted, encrypt the corresponding data;
- a selection circuit configured to selectively output either first data or second data, the first data being encrypted data obtained by encrypting the received data in the encryption execution circuit in accordance with the control signal indicating that the received data is to be encrypted, the second data being non-encrypted data by bypassing the encrypting of the received data in the encryption execution circuit in accordance with the control signal indicating that the received data is not to be encrypted; and
- an output control circuit configured to
  - control the selection circuit such that a frequency of second timing is smaller than a frequency of first timing, the first timing is timing at which outputting of the encrypted first data is permitted, the second timing is timing at which outputting of the non-encrypted second data is permitted, the output control circuit is configured to operate such that a larger a data size of the non-encrypted second data to be outputted at once, a smaller the frequency of second timing.

6. A method of data output control, the method comprising:

receiving, from a processing circuit, data and a control signal, the control signal being a signal used to determine whether the data is to be encrypted;

in response to the control signal indicating that the data is to be encrypted, encrypting the corresponding data;

selectively outputting either first data or second data, the first data being encrypted data obtained by encrypting the received data in the encryption execution circuit in accordance with the control signal indicating that the received data is to be encrypted, the second data being non-encrypted data by bypassing the encrypting of the received data in the encryption execution circuit in accordance with the control signal indicating that the received data is not to be encrypted;

controlling the selection circuit such that a frequency of second timing is smaller than a frequency of first timing, the first timing is timing at which outputting of the encrypted first data is permitted, the second timing is timing at which outputting of the non-encrypted second data is permitted, the controlling of the selection circuit is configured to operate such that a larger a data size of the non-encrypted second data to be outputted at once, a smaller the frequency of second timing.

\* \* \* \* \*